United States Patent [19]
Foss

[11] Patent Number: 4,735,423
[45] Date of Patent: Apr. 5, 1988

[54] SLIDING RUMP SHIELD

[76] Inventor: Lynn Foss, 412 San Mar Dr., Olympia, Wash. 98506

[21] Appl. No.: 936,164

[22] Filed: Nov. 28, 1986

[51] Int. Cl.$^4$ ............................................. B62B 15/00
[52] U.S. Cl. .......................................... 280/18; 2/2.5;
2/46; 280/12 R
[58] Field of Search ...................... 280/12 R, 12 A, 18, 280/19; 2/2.5, 46, 231

[56] References Cited

U.S. PATENT DOCUMENTS

| | | | |
|---|---|---|---|
| 2,471,071 | 5/1949 | McDonald | 2/2.5 |
| 2,667,996 | 2/1954 | Fanelli | 280/12 R |
| 2,826,424 | 3/1958 | Erickson | 220/1 R |
| 3,154,313 | 10/1964 | Zurowski | 280/18 |
| 3,693,849 | 9/1972 | Knabenbauer | 280/18 |
| 3,696,439 | 10/1972 | Durham | 2/2.5 |
| 3,708,799 | 1/1973 | Smithdeal | 2/46 |
| 4,580,408 | 4/1986 | Stuebner | 2/2.5 |
| 4,657,266 | 4/1987 | Böhme | 280/12 R |

FOREIGN PATENT DOCUMENTS 19359 of 1908 United Kingdom.

Primary Examiner—David M. Mitchell
Assistant Examiner—Tamara L. Finlay
Attorney, Agent, or Firm—Brian J. Coyne

[57] ABSTRACT

A flexible shield mountable on the rump of a user's body to protect the user from incurring bruises and abrasions while sliding down a hill. The shield comprises a skid plate and adjustable straps for releasably attaching the skid plate to the rump of the user. The skid plate is preferably a sheet of flexible plastic, substantially rectangular in planform, having a smooth posterior surface for sliding on snow or ice, and having its lower portion bifurcated by a vertical slit to facilitate walking with the shield in place. A waist strap is inserted through slits in the left and right upper corners of the skid plate. Left and right leg straps secure the lower portion of the skid plate to the user's legs. A crotch strap is inserted through a slit in a flap in the lower central portion of the skid plate, the two ends of the crotch strap passing between the legs and being connected to the ends of the waist strap.

3 Claims, 2 Drawing Sheets

SLIDING RUMP SHIELD

BACKGROUND OF THE INVENTION

1. Field of the Invention

This invention is for a flexible shield mountable on the rump of a user's body for sliding down a hill.

2. Description of the Prior Art

In descending from a mountain, hikers frequently slide and fall on their hindquarters or rumps, sometimes incurring bruises and abrasions or damage to their clothing from sliding contact with soil and stones. When hiking down snow or ice covered areas, hikers may sometimes wish to do a controlled slide in a seated position as possibly the safest and fastest method of descent. It is, therefore, desirable for the hiker to have a shield having a smooth surface for sliding that can be mounted on his rump to protect him from bruises and abrasions while descending from a mountain. As the hiker will usually have a knapsack mounted on his back and may have to cope with difficult terrain, it is important that the shield be small and light in weight; that it leave his hands free and not interfere with the movement of his arms and legs; that, when in use, it be attached to the hiker's body so that there is no chance it may slip out from underneath him and precede him down the mountain; and that it require a minimum of attention from him so as not to distract him from concentrating on his descent, i.e, the hiker should not need to stop and mount the shield every time he desires to slide, and then have to dismount it when he desires to resume walking.

In the prior art, light weight coasting devices and sleds were well known. For instance, A. G. Erickson described a light weight, saucer-shaped coasting device for sliding on ice or snow in the seated position. U.S. Pat. No. 2,826,424 (Mar. 11, 1958; Class 280-12). While Ericson's device would serve the purpose of protecting the user's rump from bruises and abrasions, it does not suit the hiker as it is designed to be carried by hand. Likewise unsuitable are the combination back pack and pack sled disclosed by Melvin K. Knabenbauer, U.S. Pat. No. 3,693,849 (Sept. 26, 1972; Class 224/9, 224/25A, 280/18, 280/20), the combination packboard and sled disclosed by J. A. Fanelli, U.S. Pat. No. 2,667,996 (Feb. 2, 1954), and the combined seat and sled assembly disclosed by B. M. Zurowski, U.S. Pat. No. 3,154,313 (Oct. 27, 1964; Class 280-18), as they must be dismounted from their users' backs each time they wish to use them as sleds.

Of course, body protecting shields are also well known in the prior art. See, for instance, the body protecting shield disclosed by M. M. McDonald, U.S. Pat. No. 2,471,071 (May 24, 1949; Class 2/2.5) and the personal armor for an individual wearing a safety helmet disclosed by Roger Owen Durham, U.S. Pat. No. 3,696,439 (Oct. 10, 1972; Class 2/2.5, 128/90). Although these are capable of protecting the user's rump from harm from impacts, they are not designed for sliding in a seated position. For example, in the case of McDonald's shield, which has left and right leg protecting portions and an intermediate portion inserted in horizontal slots, even if it were made of a suitably flexible and light weight material, it would fail to give the desired protection: during sliding motion, the leg and intermediate portions would tend to be displaced upwards through the slots leaving the hiker's rump exposed.

SUMMARY OF THE INVENTION

It is an object of my invention to provide a shield mountable on the rump of a user's body for sliding down a hill, Another object of my invention is to provide a shield mountable on the rump of a user's body for sliding down a hill that leaves the user's hands free, does not interfere with the movement of his arms and legs, and remains attached to the user's body both when he is walking and when he is sliding.

A further object of my invention is to provide a shield mountable on the rump of a user's body for sliding down a hill that is relatively small, light in weight, durable, and inexpensive to manufacture.

BRIEF DESCRIPTION OF THE DRAWINGS

Similar numerals refer to similar parts throughout the several views. The terms "left,","right," "upper," and "lower" shall be understood to refer to the left, right, upper, and lower portions of the shield as shown in FIG. 2.

DESCRIPTION OF THE PREFERRED EMBODIMENT

Figure 1:
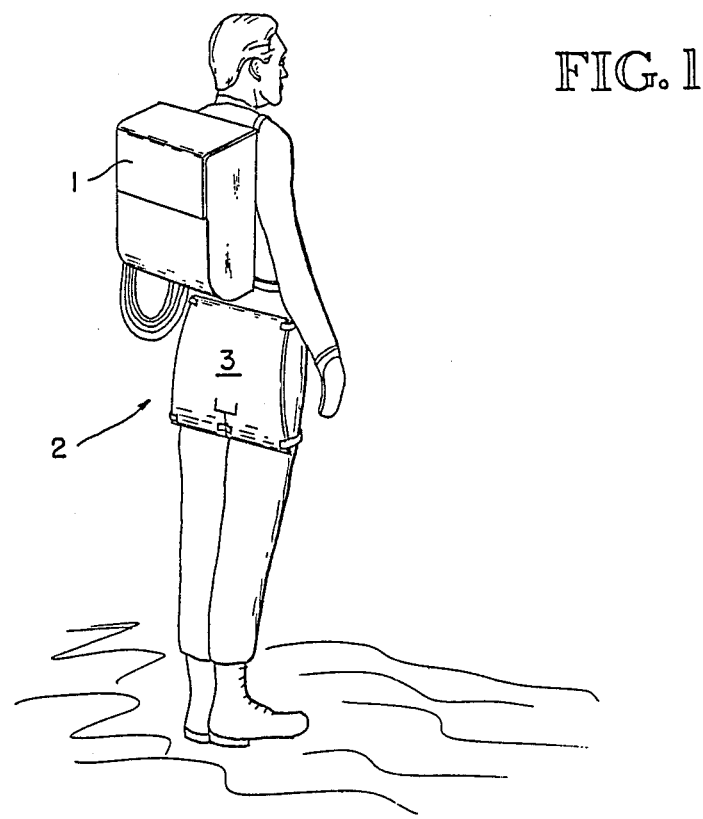
FIG. 1 is an elevational view showing my shield mounted on the rump of an adult human.

Referring now to FIG. 1, an adult hiker is shown walking with a knapsack 1 on his back and my shield, designated generrly by the numeral 2, mounted on his rump. My shield includes a skid plate 3 and adjustable strapping means for releasably attaching the skid plate 3 to the rump of the user.

Figure 2:
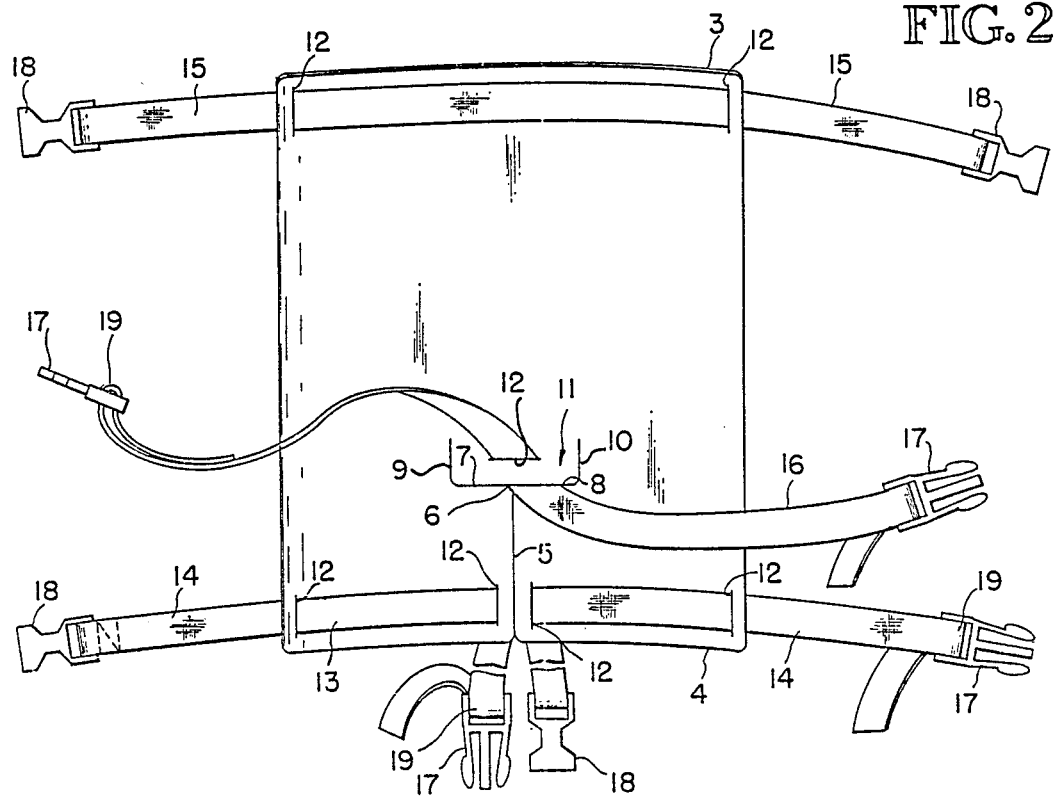
FIG. 2 is an anterior perspective view of my shield prior to its being mounted.

Referring now to FIG. 2, an anterior perspective view of the shield is shown. The skid plate 3 is preferably a flexible sheet of plastic substantially rectangular in planform that may be flexed to conform to the contours of the user's rump. Plastics marketed under the trademarks RESINOL ® and NEOPRENE ® are preferred. The lower margin 4 of the skid plate 3 is bisected by a first vertical slit 5 of length three inches, more or less, which vertical slit 5 at its apex 6 branches into left and right horizontal slits 7,8, each about two inches long, more or less. The horizontal slits 7, 8 at their leftmost and rightmost extremities merge with a pair of second vertical slits 9, 10, thereby defining flap 11.

Although there are various ways of reversibly attaching the skid plate to the rump of the user, in the preferred embodiment the adjustable strappping means described below is employed. Again referring to FIG. 2, the skid plate 3 has slits 12 at each of the following locations: the left upper and right upper corners, the left lower and right lower corners, adjacent the first veritcal slit just to the left and just to the right of it, and on the flap 11. A left leg strap 13 is inserted through slits 12 at the left lower corner and left-adjacent to the first vertical slit 5; a right leg strap 14 is inserted through slits 12 at the right lower corner and right-adjacent to the first vertical slit 5; a waist strap 15 is inserted through slits 12 at the right upper corner and the left upper corner; and a crotch strap 16 is inserted through the slit 12 in the flap 11, the flap 11 being raised away from the adjacent portion of the skid plate 3 so that both ends of the crotch strap 16 emerge from the flap 11 on the same (anterior) side of the skid plate 3. Each of the straps 13, 14, 15 and 16, is fitted with conventional buckle fasteners. In particular, each of the leg straps 13, 14 has a male portion 17 of a buckle fastener mounted at one end and a female portion 18 thereof mounted at the opposite end. The crotch strap 16 has a male portion 17 of a buckle fastener mounted at each of its ends. The waist strap 3 has female portions 18 of a buckle fastener at each of its ends.

Figure 3:
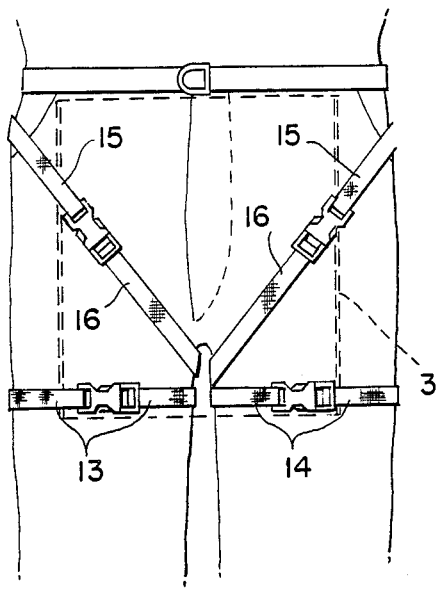
FIG. 3 is an anterior perspective view of my shield mounted on the rump of a user.

Referring now to FIG. 3, it may be seen that the skid plate 3 is releasably mounted to the user's rump by passing both ends of the crotch strap 16 between the user's legs and inserting the male portions 17 of the buckle fasteners thereof into the female portions 18 of the buckle fastenres of the waist strap 15. As may be seen in FIG. 2, each of the straps 13, 14, and 16 (but not the waist strap 15) has strap tension adjusting means 19 for securing the skid plate 3 firmly to the rump of the user.

Figure 4:
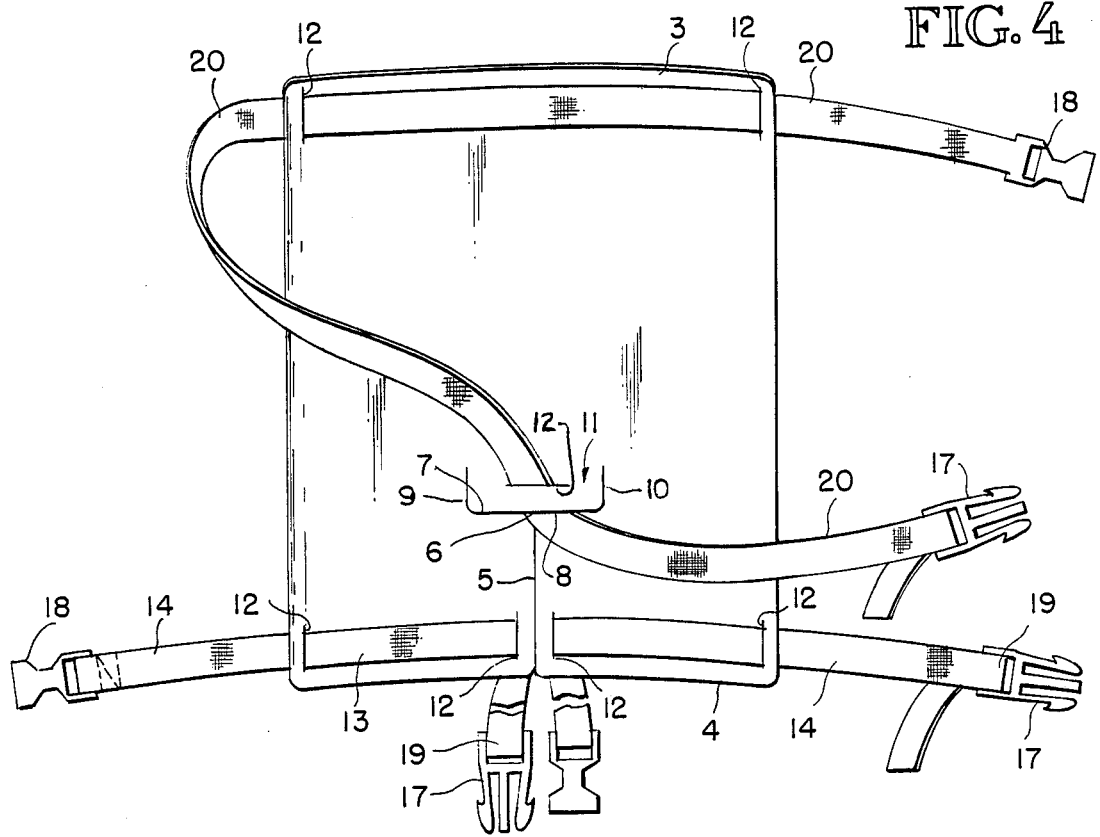
FIG. 4 is an anterior perspective view of an alternative embodiment of my shield.

In a second, alternative embodiment of my shield, one continuous combination waist-and-crotch strap 20, as illustrated in FIG. 4, is substituted for the separate waist strap 15 and crotch strap 16 of the first embodiment that is depicted in FIGS. 2 and 3. The waist-and-crotch strap 20 has a male portion 17 of a buckle fastener at one end and a female portion 18 of a buckle fastener at its opposite end. The first and second embodiments are identical in all other respects; in particular, the waist-and-crotch strap 20 is inserted through slits 11 and 12 in the same manner as previously described for the waist strap 15 and the crotch strap 16 of the first embodiment. The advantage of the second embodiment is that it eliminates one buckle fastener, which reduces the cost to manufacture the shield. The user mounts the second embodiment of my shield by inserting one leg between the skid plate 3 and that portion of the waist-and-crotch strap 20 that lies between the slit 12 of flap 11 and slit 12 of an upper corner of the skid plate 3, placing the skid plate behind his rump, drawing forward and between his legs the end of the waist-and-crotch strap nearest to the slit 12 of flap 11 and buckling it to the opposite end of the waist-and-crotch strap, fastening the left and right leg straps around his left and right legs, and adjusting the tension in the straps with the tension adjusting means.

The foregoing is considered illustrative only of the principles of my invention. Further, since numerous modifications and changes will readily occur to those skilled in the art, it is not desired to limit the invention to the exact construction and operation shown and described and accordingly all suitable equivalents may be resorted to, falling within the scope of my invention.

I claim:

1. A shield mountable on the rump of a user's body, comprising: a flexible skid plate having a smooth surface for sliding downhill, and adjustable strapping means for releasably attaching the skid plate to the rump of the user, wherein the lower central portion of the skid plate has a first vertical slit extending vertically about three inches from the lower margin of the skid plate, the first vertical slit thence branching into left and right horizontal slits each about two inches in length, and the left and right horizontal slits at their leftmost and rightmost extremities merging with second vertical slits of length about one inch, thereby defining a flap, whereby the left and right lower portions of the skid plate can bend and flex with the movement of the user's legs.

2. A shield as defined in claim 1, wherein the skid plate is substantially rectangular in planform and has slits adjacent its upper left and right corners and lower left and right corners, and further has slits adjacent to the first vertical slit at the left and right sides therof, and a slit on the flap, and wherein the adjustable strapping means includes a left leg strap inserted through the lower left corner slit and the slit left-adjacent the first vertical slit, a right leg strap inserted through the right lower corner slit and the slit right-adjacent the first vertical slit, a crotch strap inserted through the slit of the flap, and a waist strap inserted through thet slits at the right and left upper corners of the skid plate, each of the leg straps has a male portion of a buckle fastener mounted at one end and a female portion thereof mounted at the opposite end, the crotch strap has a male portion of a buckle fastener mounted at each of its ends, the waist strap has a female portion of a buckle fastener mounted at each of its ends, and the leg straps and crotch straps each have strap tension adjusting means;

whereby the skid plate is releasably mounted to the user's rump by placing the skid plate behind his rump, passing the two ends of the crotch strap between his legs and inserting the male portions of the buckle fasteners thereof into the female portions of the buckle fasteners of the waist strap, buckling the left and right leg straps about his left and right legs, and adjusting the tension in the leg and crotch straps with the strap tension adjusting means.

3. The shield as defined in claim 1, wherein the skid plate is substantially rectangular in planform and has slits adjacent is upper left and right corners and lower left and right corners, and further has slits adjacent to the first vertical slit at the left and right sides thereof, and a slit on the flap, and wherein the adjustable strapping means includes a left leg strap inserted through the lower left corner slit and the slit left-adjacent the first vertical slit, a right leg strap inserted through the right lower corner slit and the slit right-adjacent the first vertical slit, a waist-and-crotch strap inserted through the slit of the flap and through the slits at the right and left upper corners of the skid plate, each of the leg straps have a male portion of a buckle fastener mounted at one end and a female portion mounted at its opposite end, the waist-and-crotch strap has a female portion of a buckle fastener mounted at one end and a male portion of a buckle fastener mounted at its opposite end, and each of the straps has strap tension adjusting means;

whereby the skid plate is releasably mounted to the user's rump by the user's inserting one leg between the skid plate and the portion of the waist-and-crotch strap that extends from the slit of the flap to a slit of one upper corner of the skid plate, drawing forward and between his legs the end of the waist-and-crotch strap nearest the flap and buckling the said end to the opposite end of the waist-and-crotch strap, buckling the left and right leg straps about his left and right legs, and adjusting the tension in the straps with the strap tension adjusting means.

* * * * *